G. A. GASE AND E. A. SEYMER.
REFRIGERATING SYSTEM.
APPLICATION FILED FEB. 5, 1917.
1,429,132.
Patented Sept. 12, 1922.
2 SHEETS—SHEET 2.
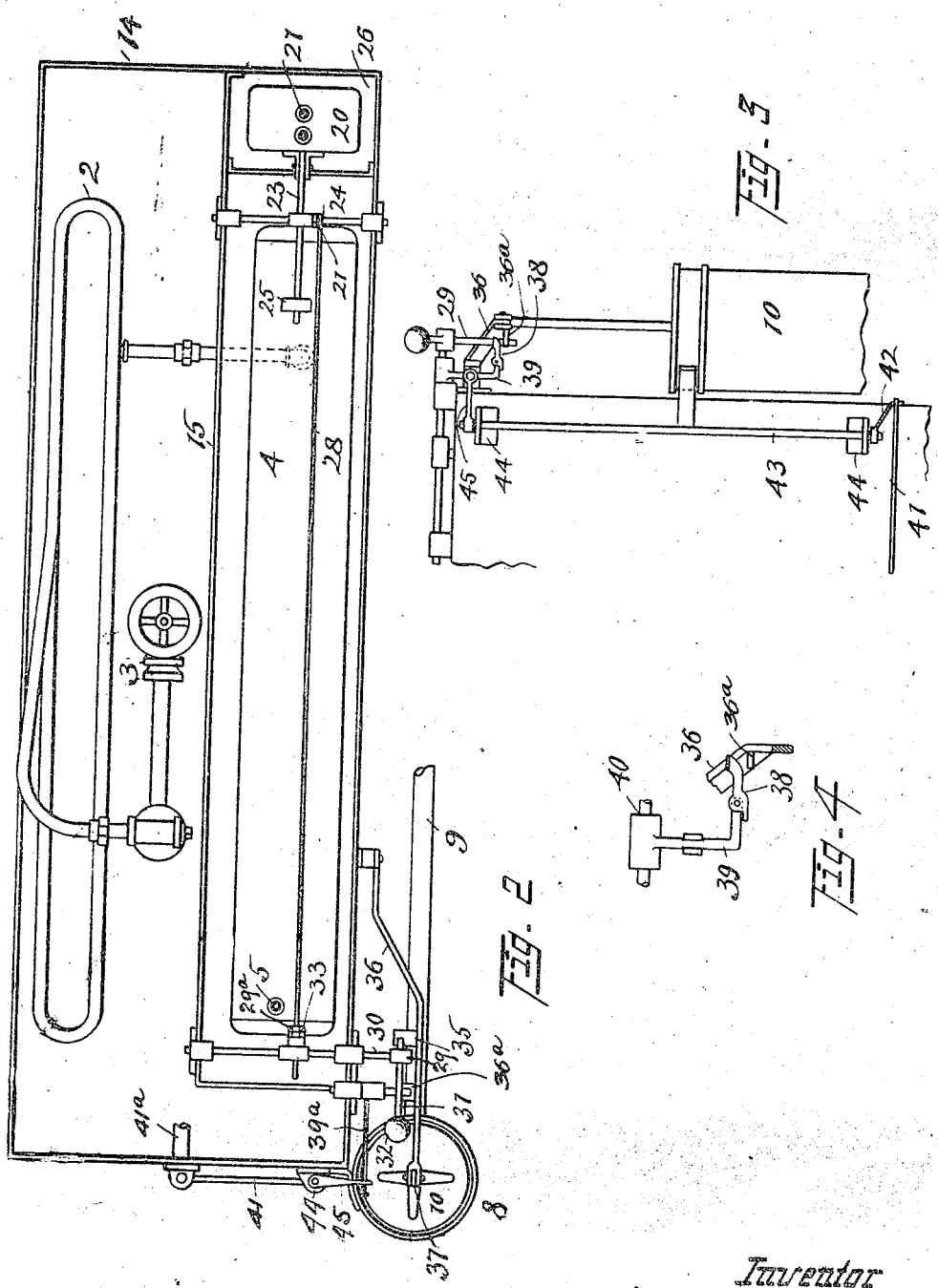

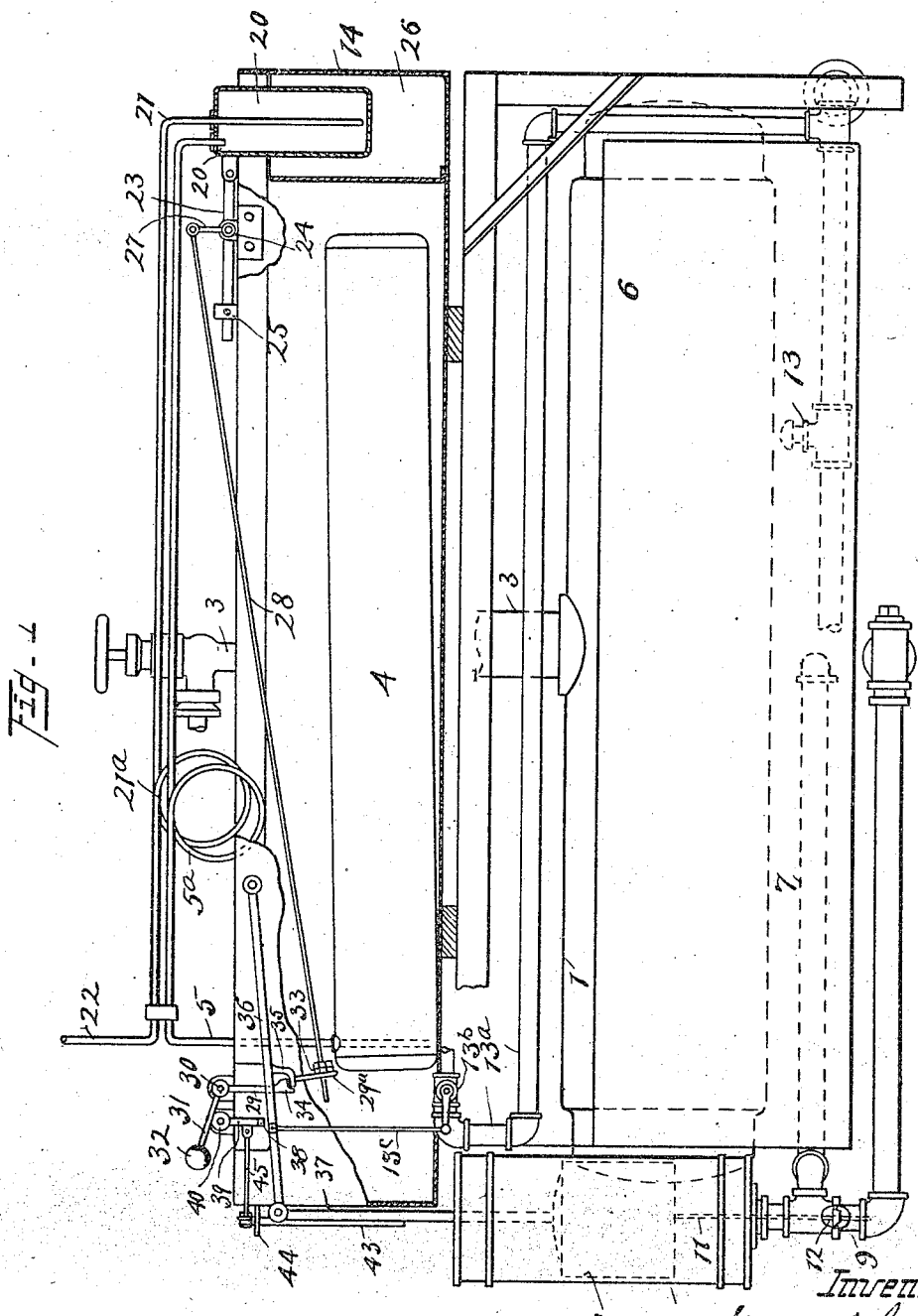

Patented Sept. 12, 1922.

1,429,132

UNITED STATES PATENT OFFICE.

GEORGE A. GASE, OF EAST CLEVELAND, AND ERVIN A. SEYMER, OF CLEVELAND, OHIO.

REFRIGERATING SYSTEM.

Application filed February 5, 1917. Serial No. 146,597.

*To all whom it may concern:*

Be it known that we, GEORGE A. GASE and ERVIN A. SEYMER, citizens of the United States, and residents, respectively, of East Cleveland, in the county of Cuyahoga and State of Ohio, and Cleveland, in the county of Cuyahoga and State of Ohio, have invented a certain new and useful Improvement in Refrigerating Systems, of which the following is a full, clear, and exact description.

This invention relates to a refrigerating apparatus of the usual type in which a suitable refrigerating material, such as ammonia gas, is liquefied and permitted to expand through an expansion coil for the purpose of extracting heat from the atmosphere or substances which surround the coil in which the expansion takes place.

The present invention has to do with the apparatus in which the gaseous ammonia or equivalent material is driven off from an absorbing tank by means of heat, the gas thus driven off under pressure subsequently being cooled to the point at which the gas liquefies.

In such machines as is well known the cycle of operation is a continuing one, that is to say, the gas is liquefied, then permitted to expand through a coil to again assume gaseous form, is absorbed in a suitable manner, and by heat is driven off from the absorber under pressure and again liquefied.

In such machines it has been usual to control the various functionings of the machine automatically, and particularly it has been a common expedient to cause the burners to light beneath the absorbing tank, for the purpose of driving off the gas from the absorbing tank, by some device which is controlled by the pressure in that part of the system in which the liquid ammonia is contained. Such a method of controlling is not entirely satisfactory, and it is the purpose of this invention to provide a means for automatically and positively insuring the functioning of the apparatus to start the operation of driving the gas from the absorber, when the liquid ammonia has been exhausted or substantially exhausted from the receptacle or tank in which it is stored, regardless of the pressures existing in the apparatus and the system of which the apparatus may be a part.

Generally speaking, the invention comprises the elements and combinations thereof set forth in the accompanying claims.

Reference should be had to the accompanying drawings forming a part of this specification, in which Fig. 1 rather diagrammatically shows in elevation an apparatus embodying the well known elements of a refrigerating apparatus and in addition the device of this invention. Fig. 2 is a top plan view of the apparatus shown in Fig. 1; Fig. 3 is an elevation showing a portion of the apparatus shown in the other figures; Fig. 4 is an elevation showing a detail of construction of a trip mechanism.

Referring to the drawings, the absorption tank is indicated at 1. This is an elongated tank which contains a substance, such as water, in which the gas is absorbed upon its return from an expansion coil, not shown, forming a part of the system of which the apparatus herein described is a portion. This tank 1 is connected with a coil of condensing pipes shown at 2 in Fig. 2, the gas which is driven off from the tank 1 by heating of the tank 1 passes through a pipe, the upper portion of which is indicated at 3, to the coil 2 as is indicated in Fig. 2.

The condensing coil 2 is connected with a tank 4 which is provided for the purpose of receiving and storing liquid ammonia, which comes from the coil 2. The liquid ammonia finds exit from the tank 4 by means of a pipe 5, the connections of which will be explained a little later.

The tank 1 is housed within a water containing receptacle 6 which as its title indicates is adapted to receive water for the purpose of cooling the liquor within tank 1 after the tank 1 has been heated and the ammonia gas driven off, the cooling being for the purpose of preparing the tank 1 to again absorb gas.

The tank 6 is by a pipe 7 connected with a tank 8 which is at one side of the tank 6 as indicated in Fig. 1. This tank is connected to a pipe 9 which leads to a sewer connection so that when desired the water contained in the tank 6 may be discharged.

Within the tank 8 there is a float 10. This float has a downwardly extending rod 11 which operates a valve 12, this valve being placed in the discharge connection from the tank 8 at a point below that at which the pipe 7 communicates with the connection to the tank 8. Therefore it will be clear that the tank 8 is in communication at all times with the tank 6 so that if there is any water in tank 6 the water will rise to the same level within the tank 8, and will tend to raise the float 10 which is within the tank 8. If the float 10 be raised by water which may be admitted to tank 8 it will operate the valve 12 so as to permit the discharge of water from the tank 6 to the sewer connection 9. For the purpose of heating the tank 1 there are burners 13 which may be connected through the pipe 13ª with any suitable source of gas supply for the purpose of heating the tank 1 at such times as it is desired in the operation of the apparatus.

The tank 4 and the coil 2 are housed within a large tank 14. Within this tank there is a subsidiary or second tank, which is indicated at 15. This subsidiary tank 15 contains the liquefied ammonia tank 4, and the walls 15 are slightly lower than the walls of the tank 14, and in practice water which is admitted for the purpose of cooling the tank 4 and the coils 2 is first admitted to the compartment containing the tank 4 so that the tank 4 will receive the coldest water supply. This water will overflow the walls of the tank 15 and into the tank 14 immersing the coils 2.

As is well known from the operation of such devices the cold water which thus immerses the tank 4 and the coil 2, will cause the gaseous ammonia which is under pressure due to the driving off of the ammonia gas to the tank 1 by heat, to liquefy in the coils 2 and the tank 4, and the tank 4 of course receiving the coolest water will maintain the liquefied ammonia which may collect therein, in its liquefied state.

In the apparatus herein shown the water which surrounds the coil 2 is utilized to cool the tank 1 after the ammonia gas has been driven off from the tank 1 by heating the same, and liquefied ammonia gas is expanding through the expansion coil, and the gaseous ammonia which has passed through the expansion coil is to be reabsorbed in the liquor contained in the tank. It will be obvious that the liquor within the tank 1 must be cooled before it is in condition to absorb the ammonia gas returning from the expansion coil. For this purpose there is a connection between the tank 14 and the tank 6 which is not shown. This connection contains a valve so that the valve may be operated at the proper time to accomplish the result which has just been stated. This effects an economy in the use of water in the operation of the apparatus. As before explained, when the water in the tank 6 has served its purpose, it is discharged from the tank 6 through the sewer connection 9.

As has before been explained, there is a pipe 5 which leads from one end of the liquid ammonia tank 4. This pipe 5 communicates with the top of a small container 20. There is also a pipe 21 which extends into the container 20 adjacent the lower portion thereof. This pipe 21 connects with the pipe 22 by which the liquid ammonia is directly supplied to an expansion coil, not shown.

The pipes 5 and 21 are rather long pipes, and intermediate their end portions are formed with coils 5ª and 21ª, this being for the purpose of giving some resiliency so that the receptacle 20 may have a limited movement without putting an undue strain upon the pipes 5 and 21.

The particular method of providing for this resiliency is the one preferred, although any other method or construction may be employed to secure the desired result.

The receptacle 20 is pivotally mounted upon a lever 23. This lever is in turn pivotally mounted as indicated at 24, and the arm of the lever which extends beyond or by the pivotal portion 24 has mounted thereon a weight 25 which may be adjusted along the arm so as to counterbalance the receptacle 20.

Within the tank 15 which surrounds the liquid ammonia tank 4 there is a small tank 26. The walls of this tank are lower than the tank 15 and in supplying water to the tanks 15 and 14, the water is first caused to flow in the tank 26, which when full will overflow into the tank 14. This arrangement insures that the coldest water supplied to the apparatus will be in the tank 26, so that the contents of the receptacle 20 will be cooled to the lowest temperature of any of the various receptacles, and will thus insure the contents, which is liquid ammonia, always being maintained in a liquid condition.

It will be apparent that liquid ammonia which passes from the tank 4 will through the pipe 5 be delivered to the receptacle 20, and from the receptacle 20 will pass by means of the pipes 21 and 22 to the place where the liquid ammonia is to be expanded. Therefore, at all times that there is liquid ammonia in the tank 4 there will be liquid ammonia in the receptacle 20, and in fact after the liquid ammonia has entirely passed from the tank 4 there will be some liquid ammonia in the receptacle 20.

When the receptacle 20 is filled with liquid ammonia the receptacle 20 will be depressed because of the weight of the liquid ammonia within the receptacle 20. This will then cause the receptacle 20 to be submerged at least in part, within the water in the tank 26. While this condition is existent, the lever 23 will occupy a position substantially such as shown in Fig. 1, or it may perhaps be tilted slightly in a clockwise direction as the weight of the receptacle filled with liquid ammonia will overbalance the combined countereffect of the weight 25 and the buoyancy of the water in which the receptacle is immersed.

When, however, the liquid ammonia has become exhausted from the tank 4, and is being exhausted from the receptacle 20 by passing through the pipe 21, the countereffect of the weight 25 assisted by the buoyancy of the water in which the receptacle 20 is in part submerged, will cause the receptacle 20 to rise, moving the lever 23 about its pivot in a counter-clockwise direction.

To the lever 23 there is secured an arm 27, and pivotally connected with the arm 27 is a rod 28. This rod at its lower end extends through an opening formed in an arm 29$^a$ which is secured upon a shaft indicated at 30. There is a second arm 29 secured upon a shaft arm 30, which arm has an angular extension 31, to which angular extension there is secured a weight 32 so that the arm is normally thrown forward because of the overhanging weight 32. The arm 29$^a$ bears against a nut 33 carried upon the rod 28, the nut and rod having a screw threaded engagement so that the nut may be adjusted along the rod 28 and so determine the position of the lever 29$^a$ with respect to the rod. The arm 29 carries a foot 34 which engages with a hook or offset 35 formed upon a lever 36. The foot 34 engages with the offset 35 so as to prevent the lever 36 from rising until the foot 34 is moved from its engagement with the offset 35.

The lever 36 is pivotally connected with a rod 37 which extends within the tank 8 and is secured to the top of the float 10. It will therefore be apparent that when the lever 36 is locked by the foot 34, the float 10 is prevented from rising within the tank 8, even if there be water within that tank, and this condition is maintained so long as the receptacle 20 contains liquid ammonia.

It will be apparent that as the liquid ammonia passes from the receptacle 20, and this receptacle rises, due to its buoyancy in the water in tank 26, the lever 23 is tilted and so the rod 28 is moved, which in turn pushes the arm 29, thereby moving the foot 34 to release the offset 35, which from the construction described, it will be apparent, permits the float 10 to rise within the tank 8 if there is water within that tank.

It is necessary that the valve 12 be maintained in its closed position during the period when the tank 1 is acting as an absorber, but inasmuch as the water from the tank 6 may flow to the tank 8, it will be apparent that the tendency of the float 10 within the tank 8 would be to rise and so open the valve 12. However, the float 10 will be prevented from rising because the foot 34 will hold the lever 36 in its locked position and so prevent the float 10 from rising until such time as the liquid ammonia within the tank 4 has been exhausted, and has been substantially exhausted from the receptacle 20. Then as has previously been explained, the rise of the receptacle 20 will move the foot 34 to such position as to release the lever 36 and permit the float 10 to rise, thus opening the valve 12 and permitting the water within the tank 6 to run to the sewer.

This functioning of the apparatus, however, only takes place when the liquid ammonia has entirely passed from the storage tank for the same, at which time the ammonia gas from the expansion coil has substantially all been reabsorbed by the liquor in tank 1, and, of course, under these conditions it is necessary to again heat the tank 1 for the purpose of driving off the ammonia gas; hence the presence of the water in the tank 6 is not desirable or necessary.

A gas valve 13$^b$ is placed in the gas main 13$^a$ and this valve is operated by a rod 13$^c$ which is attached to the lever 36 and is moved by the same.

When the lever 36 is held down by the foot 34, the gas is shut off and conversely, when the lever 36 rises the rod 13$^c$ moves in a manner to open the gas valve.

The particular point which it is desired to emphasize in connection with the auxiliary liquid ammonia receptacle 20 and the parts connected therewith, is that the use of this receptacle and its co-operating parts serves to cause the water to discharge from tank 6, and the gas for heating tank 1 to be affected immediately, at the time that the liquid ammonia has passed from the receptacle 20, and this operation is entirely independent of the pressure that may be existent in the system at the time. Furthermore, the very manner in which the tank 20 and its co-operating parts operate is such as to insure its correct operation and functioning at the proper time, as the forces operating, that is to say, the gravity of the receptacle 20 and the buoyancy of the water within the tank 26 are constant forces which do not vary and which do not change or vary with the constant use of the apparatus, nor are these devices in any material way affected by the change of atmospheric temperature, nor do they require any particular adjustment after they have once been adjusted to meet the conditions under which the apparatus is operated.

When the float 10 has been released by the movement of the foot 34, as previously described, the float 10 will immediately rise, due to the fact that it is more or less submerged by the water within the tank 8. As it rises, it passes the head 38 carried upon a lever 39, which lever is pivoted, as indicated at 40. The head 38 will be pushed back by the lever 36 so that the lever may pass beyond the head, but as the lever tends to again descend, a projection 36ª on lever 36 is caught by the head 38 and maintained in its upper position. This then prevents the float 10 from descending as the water passes out of the tank 6, so that by no chance can the valve 12 become closed.

The float 10 is released by the head 38 just before water is admitted to the tank 6, and this is accomplished automatically by means of the movement of a thermostat indicated at 41ª, associated with the tank 1. This thermostat operates a rod 41. The thermostat, of course will be expanded as the tank 1 is heated, and when the water in the tank 1 has been heated to the point where the ammonia is entirely expelled, the temperature of the water will be sufficient to cause the thermostat to move the rod 41. The rod 41 is by means of a crank 42, connected with a shaft 43 which is mounted in brackets 44. At the upper end of the shaft 43 there is an arm 45 which has a loose connection with a rod 39ª which in turn is secured to the arm 39. When, therefore, the rod 41 is moved by the expansion of the thermostatic couple it causes, through the instrumentality of the crank 42, shaft 43 and arm 45, the arm 39 to be moved, and the movement causes the extension 38 of the arm 39 to be moved out of engagement with the shoulder or stop 36ª which is carried upon the lever 36. Therefore the lever 36 is released and by gravity the float drops in the tank 8 so that the valve 12 is closed.

When the float 10 has dropped to its lowest position, the foot 34 is above the hook 35, as it will be apparent that the foot 34 may be moved back by the hook 35 as it descends, but owing to the overhanging weight 32, the foot 34 would be moved back into position above the hook 35 as soon as the hook 35 had passed the foot 34.

We wish to call attention to the fact that the presence of the water surrounding tank 20 is primarily for the purpose of maintaining the contents of the receptacle in liquid condition as the weight 25 is the main counterbalancing agency. If the tank 20 were cooled otherwise than by water, the counterbalancing of tank 20 would be entirely by weight 25.

Having thus described our invention, what we claim is:

1. In a refrigerating apparatus, an absorbing means, liquefied gas containing means, a water tank for cooling the absorbing means, a device for controlling the discharge of water from said tank, and means operatively connected with the said device controlled by the quantity of liquefied gas in the liquefied gas containing means for effecting the operation of said device to permit discharge of the water from said tank.

2. In a refrigerating apparatus, an absorbing means, liquefied gas containing means, a water tank for cooling the absorbing means, a valve for controlling the discharge of water from said tank, and means, operatively connected with the valve, controlled by the body of liquefied gas in the liquefied gas containing means for effecting the operation of said valve when substantially all the liquefied gas has passed from the liquefied gas containing means.

3. In a refrigerating apparatus, an absorbing means, a liquefied gas containing means, a water tank for cooling the absorbing means, a valve controlling the discharge opening of said water tank, and means controlled by the quantity of liquefied gas in the liquid gas containing means for effecting the operation of said valve to permit discharge of water from said water tank.

4. In a refrigerating apparatus, an absorbing means, a liquefied gas containing means, a water tank for cooling the absorbing means, a valve for controlling the discharge of water from said tank, a device adapted to co-operate with the liquified gas in the liquified gas containing means said device having an operative connection with the aforesaid valve, said device moving to effect the operation of said valve to permit discharge of water from said water tank when substantially all of the liquefied gas has passed from the liquefied gas containing means.

5. In a refrigerating apparatus, an absorbing means, liquefied gas containing means, a water tank for cooling the absorbing means, a valve for controlling the discharge of water from said tank, an auxiliary liquefied gas containing receptacle, means connecting the said receptacle with the liquefied gas containing means, means for supporting said receptacle which permits a movement of the receptacle, operative connections between the receptacle and the aforesaid valve, the said connections maintaining the valve in closed position when the said receptacle is filled with liquefied gas and the said connections effecting the operation of said valve to permit the discharge of water from said tank when the said receptacle is empty.

6. In a refrigerating apparatus, an absorbing means, a liquefied gas containing means, a water tank for cooling the absorbing means, a valve for controlling the discharge of water from the said tank, an auxiliary liquefied gas containing receptacle, operative connections between the said receptacle and the said valve, the said receptacle when containing liquefied gas maintaining the same operative connections in such condition that the valve is held in closed position, and the receptacle when empty causing the said operative connections to move to effect an operation of the valve to open position.

7. In a refrigerating apparatus, an absorbing means, a liquefied gas containing means, a water tank for cooling the absorbing means, a valve for controlling the discharge of water from said tank, an auxiliary liquefied gas containing receptacle, the said receptacle having a pipe connection with the liquefied gas containing means, the said receptacle also having a discharge pipe whereby all the liquefied gas from the liquefied gas containing means must pass through the said receptacle, means for pivotally mounting said auxiliary receptacle, means tending to raise the said receptacle against the action of the weight of the liquefied gas in said receptacle, operative connections between the said receptacle and the valve, said operative connections maintaining the valve in closed position when the receptacle contains liquefied gas, the said receptacle being moved upward when it is empty, the said operative connections then effecting a movement of the valve to open position thereby to discharge water from the said tank.

8. In a refrigerating apparatus, an absorbing means, liquefied gas containing means, a water tank for cooling the absorbing means, a valve for controlling the discharge of water from said tank, an auxiliary liquefied gas containing receptacle, means for movably mounting the said receptacle, a pipe connection between the said receptacle and the liquefied gas containing means, a discharge pipe for the said receptacle, a tank containing a fluid in which the said auxiliary receptacle is immersed, operative connections between the said receptacle and the said valve, said operative connections maintaining the valve in closed position when the receptacle contains liquefied gas, and effecting an operation of the valve to open position when the auxiliary receptacle contains no liquefied gas.

9. In a refrigerating apparatus, an absorbing means, a liquefied gas containing means, a water tank for cooling the absorbing means, a valve for controlling the discharge of water from said tank, an auxiliary liquefied gas containing receptacle, a pipe connecting the liquefied gas containing means with the auxiliary receptacle, an exit pipe from said receptacle, a pivoted lever upon which the said receptacle is mounted, means whereby the receptacle is buoyed up, a rod connected with the said lever, and operative connections between the said rod and the said valve whereby the valve may be operated by the movement of the said receptacle when it is empty.

10. In a refrigerating apparatus, an absorbing means, liquefied gas containing means, a water tank for cooling the absorbing means, a device for controlling the discharge of water from said tank, heating means for the absorbing means, a second device for controlling the functioning of said heating means, and means controlled by the quantity of liquefied gas in the liquefied gas containing means operatively connected with the said controlling device, and the device controlling the heating means for effecting the operation of the said devices to permit the discharge of water from said tank and cause the functioning of said heating means.

11. In a refrigerating apparatus, an absorbing means, liquefied gas containing means, a water tank for cooling the absorbing means, a device for controlling the discharge of water from said tank, means for heating the absorbing means, a second device for controlling the functioning of said heating means, an auxiliary liquefied gas containing receptacle, means connecting the said receptacle with the liquefied gas containing means, means for supporting the said receptacle which permits a movement of the said receptacle, operative connections between the receptacle and the aforesaid device associated with the water tank and also with the second device associated with the heating means the said connections maintaining the devices in closed position when the said receptacle is filled with liquefied gas, and the said connections effecting the operation of said devices to permit the discharge of water from said tank and causing the functioning of the heating device when the said receptacle is empty.

12. In a refrigerating apparatus, an absorbing means, a liquefied gas containing means, a tank for cooling the absorbing means, a device for controlling the discharge of water from said tank, means for heating the absorbing means, a device controlling the functioning of said heating means, an auxiliary liquefied gas containing receptacle, a pipe connecting the receptacle with the liquefied gas containing means, a discharge pipe for the said receptacle whereby all the liquefied gas from the liquefied gas containing means must pass through the said receptacle, means for supporting said receptacle which permits a movement of the said receptacle, means tending to raise the said receptacle against the action of the weight of the liquefied gas in said receptacle, operative connections maintaining the said devices in closed position when the receptacle contains liquefied gas, the said receptacle being moved by the means tending to raise the said receptacle when said receptacle is empty, the said operative connections then effecting a movement of the aforesaid devices to permit the discharge of the water from the said tank and the said heating means to function.

13. In a refrigerating apparatus, an absorbing means, a liquefied gas containing means, a water tank for cooling the absorbing means, a device for controlling the discharge of water from said tank, means for heating the absorbing means, a second device for controlling the functioning of the said heating means, an auxiliary liquid gas containing receptacle, a pipe connecting the liquefied gas containing means with the auxiliary receptacle, an exit pipe from said receptacle, a pivoted lever upon one end of which said receptacle is mounted, a counterweight upon the opposite end of said lever, a rod connected with said lever, and operative connections between the said rod and the aforesaid devices whereby the said devices are operated by the movement of the said receptacle when it is empty.

In testimony whereof, we hereunto affix our signatures.

GEORGE A. GASE.
ERVIN A. SEYMER.